US011378192B2

(12) United States Patent
Biwersi

(10) Patent No.: US 11,378,192 B2
(45) Date of Patent: Jul. 5, 2022

(54) VALVE

(71) Applicant: HYDAC Systems & Services GmbH, Sulzbach (DE)

(72) Inventor: Sascha Alexander Biwersi, Mettlach (DE)

(73) Assignee: HYDAC SYSTEMS & SERVICES GMBH, Sulzbach (DE)

( * ) Notice: Subject to any disclaimer, the term of this patent is extended or adjusted under 35 U.S.C. 154(b) by 59 days.

(21) Appl. No.: 17/055,683

(22) PCT Filed: May 9, 2019

(86) PCT No.: PCT/EP2019/061898
§ 371 (c)(1),
(2) Date: Nov. 16, 2020

(87) PCT Pub. No.: WO2019/219491
PCT Pub. Date: Nov. 21, 2019

(65) Prior Publication Data
US 2021/0199206 A1 Jul. 1, 2021

(30) Foreign Application Priority Data

| May 18, 2018 | (DE) | 10 2018 207 927.7 |
| May 18, 2018 | (DE) | 10 2018 207 928.5 |
| May 18, 2018 | (DE) | 10 2018 207 929.3 |

(51) Int. Cl.
| F16K 11/07 | (2006.01) |
| F15B 13/04 | (2006.01) |
| F15B 13/044 | (2006.01) |
| F15B 15/06 | (2006.01) |
| F15B 21/00 | (2006.01) |
| F16K 31/52 | (2006.01) |

(52) U.S. Cl.
CPC ...... F16K 11/0708 (2013.01); F15B 13/0402 (2013.01); F15B 13/0444 (2013.01);
(Continued)

(58) Field of Classification Search
CPC .... F16K 11/0708; F16K 31/523; F16K 31/04; F16K 31/54; F16K 37/0033; F16K 11/07;
(Continued)

(56) References Cited

U.S. PATENT DOCUMENTS 4,463,660 A * 8/1984 Mucheyer ............. F16K 27/041
137/596.13
4,615,358 A * 10/1986 Hammond .......... F15B 13/0435
137/625.68
(Continued)

FOREIGN PATENT DOCUMENTS

| DE | 197 15 020 | 10/1998 |
| DE | 10 2006 002 920 | 7/2007 |
(Continued)

OTHER PUBLICATIONS

Translation of EP0833013 (Year: 2022).*
International Search Report (ISR) dated Jul. 25, 2019 in International (PCT) Application No. PCT/EP2019/061898.

Primary Examiner — Kelsey E Cary
(74) Attorney, Agent, or Firm — Wenderoth, Lind & Ponack, L.L.P.

(57) ABSTRACT

A valve, which is characterized in that between a neutral position (38) of a control spool (STS) and one of its end positions (34, 42) a regeneration position (36) is provided. In the regeneration position, two utility ports (A, B) are interconnected in a fluid-conveying manner, or a floating position (40) is provided, in which these utility ports (A, B) are interconnected in a fluid-conveying manner. A further valve is characterized in that by a further motion of the control spool (STS) in the same direction, as that, in which a fluid connection is established between the utility ports (A, B) starting from the neutral position (38), this fluid connection is interrupted.

17 Claims, 7 Drawing Sheets

(52) U.S. Cl.
CPC ............ *F15B 15/06* (2013.01); *F15B 21/008* (2013.01); *F16K 31/523* (2013.01)

(58) Field of Classification Search
CPC .. F15B 13/0402; F15B 13/0444; F15B 13/10; F15B 13/0407; F15B 15/06; F15B 21/008; F15B 2013/0409; F15B 2013/0412; F15B 2211/30535; F15B 2211/3127; Y10T 137/8671
See application file for complete search history.

(56) References Cited

U.S. PATENT DOCUMENTS 8,291,925 B2 * 10/2012 Gehlhoff ............... F15B 20/002
 137/596.17
2004/0182233 A1 9/2004 Korogi

FOREIGN PATENT DOCUMENTS

| | | |
|---|---|---|
| DE | 10 2007 054 137 | 5/2009 |
| DE | 10 2008 008 092 | 6/2009 |
| DE | 10 2013 021 317 | 6/2015 |
| DE | 10 2015 015 685 | 6/2017 |
| DE | 10 2016 011 860 | 4/2018 |
| EP | 0 833 013 | 4/1998 |
| EP | 1 108 895 | 6/2001 |
| JP | 4-88202 | 3/1992 |

\* cited by examiner

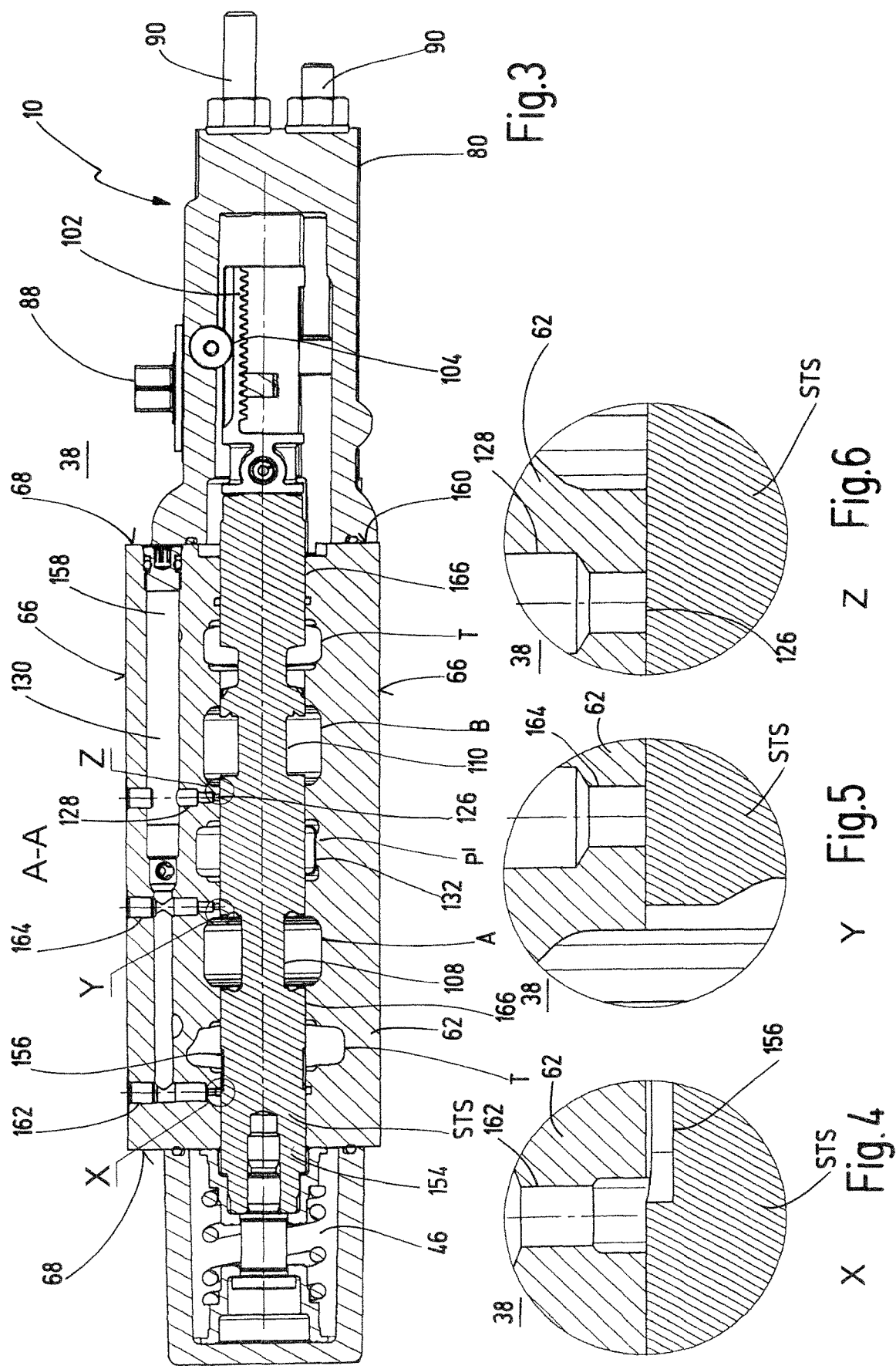

VALVE

FIELD OF THE INVENTION

The invention relates to a valve having a valve housing, which has at least one pressure supply port, a first utility port, a second utility port and a return port. A control spool is guided in a longitudinally movable manner in the valve housing for controlling these individual ports. The fluid connections between the ports are interrupted in a central neutral position of the control spool. When the control spool moves from the neutral position in the direction of a first end position of the control spool, the pressure supply port is connected to the first utility port, and the second utility port is connected to the return port in a fluid-conveying manner. When the control spool moves from the neutral position in the direction of a second end position of the control spool opposite from the first end position, the pressure supply port is connected to the second utility port, and the first utility port is connected to the return port. The utility ports are separated from each other in the end positions of the control spool.

The invention further relates to a valve having a valve housing, which has a first utility port and a second utility port. A control spool is guided in a longitudinally movable manner in the valve housing for controlling these utility ports. A fluid connection between the utility ports can be established by moving the control spool from a neutral position.

BACKGROUND OF THE INVENTION

Such valves, which are used to operate hydraulic motors or differential cylinders, are known in the state of the art. In particular for differential cylinders, which lift or lower masses, it has proven to be advantageous to feed the hydraulic fluid displaced from one working chamber directly into the other working chamber when the piston moves, instead of letting the hydraulic fluid flow unused out of one working chamber in the direction of the tank and in parallel pumping it out of the tank into the other working chamber, thereby consuming a lot of energy.

For this purpose, valves have been developed in the past, which, in addition to the lift-neutral-lower positions, also feature a floating position, in which the piston of the differential cylinder can move freely, and a rapid traverse, in which the piston moves faster: DE 10 2008 008 092 A1 and DE 10 2007 054 137 A1. The rapid traverse is also called regeneration. The logic of the positions of the valve spool is lifting-neutral-lowering-regenerate-floating in DE 10 2008 008 092 A1. In the case of DE 10 2007 054 137 A1 the logic is regenerate-lifting-neutral-lowering-floating.

If the valves are additionally formed as load-sensing valves, in which a load pressure is detected in particular at one of the utility ports and is transmitted to an upstream individual pressure compensator valve and/or a hydraulic pump, it has been shown that a lot of energy is wasted during operation. Also, during parallel operation of several valves situations occur in which the valves consume a larger pump volume flow than the pump can supply. This condition is also known as undersaturation. There are two load cases during lifting and lowering loads using a differential cylinder, in which cases the behavior of the known valves is particularly energy inefficient: (1) lifting at low load and (2) lowering at high load.

In the first load case of "lifting at low load", the valve connects a bottom side of the differential cylinder to a pump and its rod side to a tank. In that case, the pump has to provide all the hydraulic fluid needed to extend the piston, for which however only a small pressure is required. If now in a system further functions are operated in parallel, to which higher loads are applied, a pressure compensator valve has to be used to regulate the pump pressure down to a level that is appropriate for the low load. Hydraulic fluid then uselessly drains to the tank. A further problem is that in this case the valve may consume such a large pump flow that the functions operated in parallel cannot be adequately supplied, and therefore, become slower, although theoretically there is enough energy available to operate all the functions.

In the second load case of "lowering at high load," the valve connects a highly pressurized bottom side to the tank and connects the rod side to the pump. In this case, the hydraulic fluid flows unused from the bottom side to the tank, and hydraulic fluid has to be supplied in parallel at the rod side. In this case, the self-weight of the load is usually sufficient to lower the load without requiring the support of the pump.

SUMMARY OF THE INVENTION

Based on this state of the art, the invention addresses the problem of providing an improved valve having a higher energy efficiency and a simpler structure.

This problem is basically solved by valves having, between the neutral position and one of the end positions, a regeneration position is provided, in which the utility ports are interconnected in a fluid-conveying manner, or a floating position is provided, in which the utility ports are interconnected in a fluid-conveying manner.

In this way, the more energy-efficient logics of neutral-regeneration-lifting or neutral-floating-lowering can be implemented, ensuring that the hydraulic fluid available in the differential cylinder is first used to move the load before the pump supplies additional hydraulic fluid. A very small pump volume flow is then required for the load case of "lifting at low load" and in the load case of "lowering at high load" it may even possible that no pump volume flow is required at all.

Particularly advantageously, in the regeneration position the first utility port is connected to the second utility port via the pressure supply port, preferably via at least two circumferential recesses at the control spool, in a fluid-conveying manner. Thus, compared to a conventional 4/3 directional control valve, a regeneration position can be provided by only one additional recess at the control spool. That regeneration position permits considerable savings in pump power. It is advantageous if the second utility port is exclusively connected to the pressure supply port in the regeneration position and, in that way, is separated from the return port.

In the floating position, the first utility port can be connected to the second utility port via the return port, preferably via two circumferential recesses at the control spool, in a fluid-conveying manner. Again, only one additional recess at the control spool is required to provide this functionality. The fluid can then flow from one utility port to the other utility port via the return port. It is advantageous if the second utility port is exclusively connected to the return port in the floating position and is in that way separated from the pressure supply port.

The regeneration position may be advantageously provided between the neutral position and the first end position of the control spool, in particular the end position for lifting.

The floating position is provided between the neutral position and the second end position of the control spool, in particular the position for lowering. In this case the spool logic is built in such a way that the floating position and the regeneration position are arranged symmetrically around the neutral position. The pump power then can be reduced, both for lifting and for lowering.

In a particularly advantageous embodiment, the control spool can have two utility port recesses, which overlap with the utility ports and a further regeneration recess, which is located between the utility port recesses. In addition, or alternatively, the control spool may have a floating recess, which is located between a utility port recess and an adjacent free end of the control spool. In this way, the control spool does not have to be extended to form the functionalities. The recesses can be advantageously provided in an existing spool of a 4/3 directional control valve.

In the valve housing, a load-sensing line can also be provided, which is de-pressurized in the neutral position of the control spool via a recess of the control spool towards the return port. In particular, a groove in the control spool can connect a section of the load-sensing line, which opens out at the control spool, to the return port.

Advantageously, the load-sensing line is directly connected to one of the utility ports when the control spool is out of the neutral position. For this purpose, two sections of the load-sensing line between the utility ports can open out into a control spool bore. One of the sections each can be brought into connection with the assigned utility port by the control spool.

To switch the control spool to the correct positions, pressure sensors may be connected to the utility ports, which are connected to a control device that controls the motions of the control spool. In this way, the load situation can be determined before the valve is switched, i.e. whether it is possible to lift or lower the load in the regeneration position or the floating position. If this is not possible, it is immediately switched to one of the positions lifting or lowering.

The recesses of the control spool may have at least one proportional opening edge having at least one control groove. The control groove can be essentially triangular in shape. Furthermore, several control grooves may be distributed along the opening edge and arranged at the respective recess. The control grooves permit the load to move without jerking, and pressure peaks in the system are prevented.

For moving the control spool, an electromechanical actuator can be provided. This actuator permits the precise position control of the spool and a smooth transition between the control spool positions.

In a second solution of the problem, a valve is provided with a valve housing, which has a first utility port and a second utility port, and in which a control spool is guided in a longitudinally movable manner for controlling these utility ports. A fluid connection between the utility ports can be established by the motion of the control spool from a neutral position. This valve is characterized in that the fluid connection between the utility ports are interruptible by a further motion of the control spool in the same direction.

Each feature of the valve according to the invention can be used individually or in combination with others. The drawings are purely schematic and not to scale. In the Figures:

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 3 is a plan view in section of the valve along the line A-A in FIG. 2;

FIG. 4 is an enlarged side view of detail X of FIG. 3;

FIG. 5 is an enlarged side view of detail Y of FIG. 3;

FIG. 6 is an enlarged side view of detail Z of FIG. 3;

DETAILED DESCRIPTION OF THE INVENTION

Figure 1:
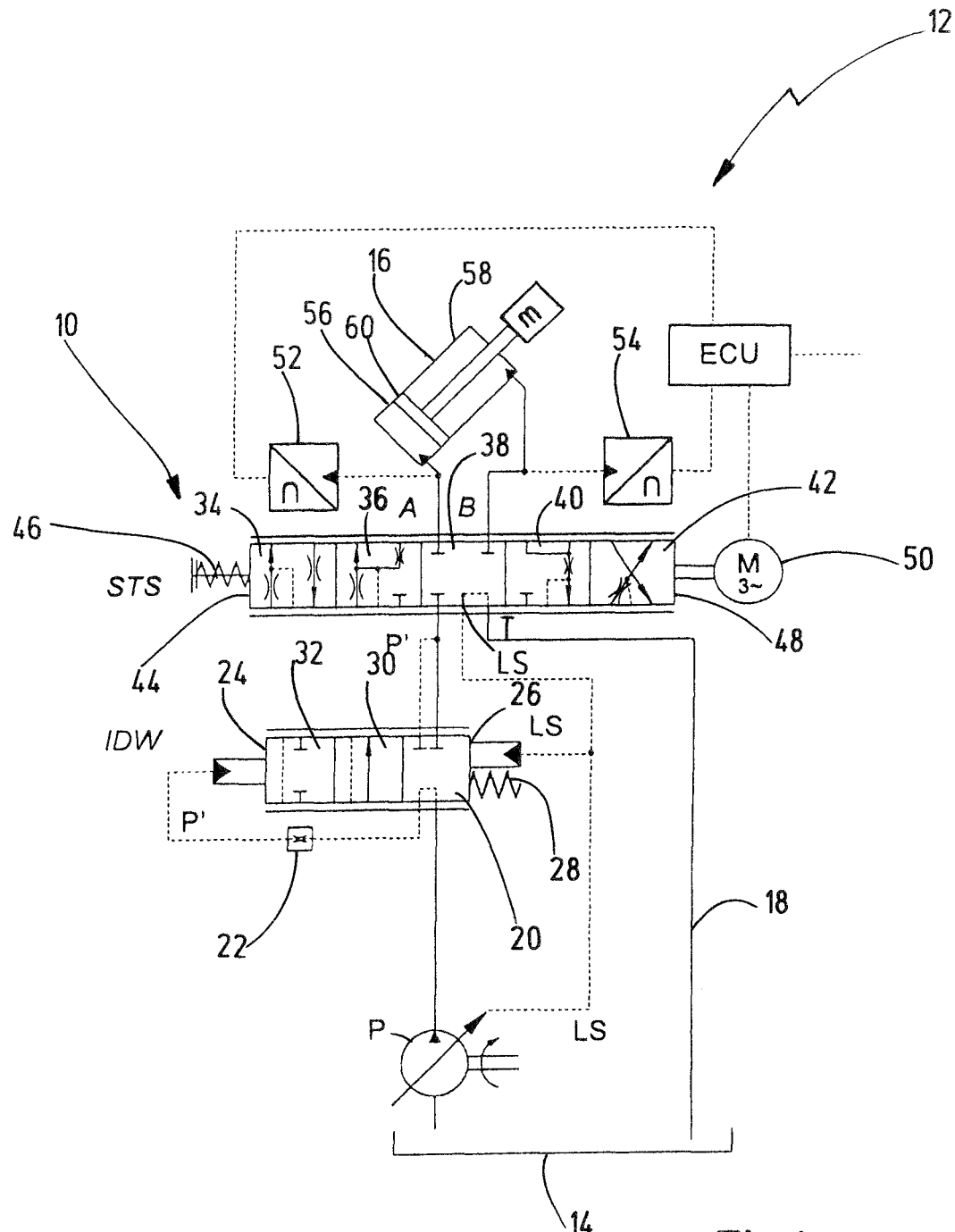
FIG. 1 is a schematic circuit diagram of a hydraulic system, having a valve according to an exemplary embodiment of the invention.

FIG. 1 shows a schematic representation of a hydraulic circuit diagram of a valve 10 according to an exemplary embodiment of the invention as part of a hydraulic overall system 12. A pump P draws hydraulic fluid 14 from a tank 14 and delivers it to an individual pressure compensator valve IDW. From the individual pressure compensator valve IDW, the hydraulic fluid gets to the 5/5-way proportional valve 10 according to the exemplary embodiment of the invention, in particular its pressure supply port P'. Starting from the utility ports A and B of the directional control valve 10, the hydraulic fluid is delivered to a hydraulic consumer 16 in the form of a differential cylinder and returned. The consumer 16 is loaded by a mass m. Returning hydraulic fluid is routed from the valve 10 to a return port T and then via a return 18 to the tank 14. A load-sensing port LS of the valve 10 is connected to the pressure compensator valve IDW and the pump P.

The pump P is an adjustable, in particular load-pressure controlled pump. It delivers the hydraulic fluid to the pressure compensator valve IDW, which has three switching positions 20, 30, 32. In the image plane on the far right, a switching position is shown, in which the fluid flow is interrupted. Only the pump pressure, preferably throttled by an orifice 22, is transmitted to the left control side 24 of the pressure compensator valve IDW, while the right control side 26 is pressurized by the load pressure of the consumer 16 and by a resetting spring 28. If the pressure on the left side 24 of the pressure compensator valve IDW exceeds the initial pressure of the resetting spring 28, the pressure compensator valve IDW is set to a central switching position 30, in which the hydraulic fluid is delivered to the valve 10. At the same time a pump pressure P', which is tapped between the pressure compensator valve IDW and the valve 10, is passed to the left control side 24 via the pressure compensator valve IDW. In the left switching position 32 of the pressure compensator valve IDW, the fluid connection between the pump P and the valve 10 is again interrupted, while however the pump pressure, as it is present upstream of the valve 10, continues to be transmitted to the left side 24 of the pressure compensator valve IDW.

The valve 10 is connected to the individual pressure compensator valve IDW. The valve 10 has a total of five switching positions, which are explained in detail below. In the far-left image plane, a lifting position 34 is shown. A regeneration position 36 is shown on the right thereof. In the central neutral position 38 all fluid connections are interrupted. To the right of the neutral position 38, a floating position 40 is provided and to the far right, the valve 10 has a lowering position 42. At its left side 44 a control spool STS is centered in the central neutral position 38 by a spring arrangement 46. At its right end 48, the control spool STS can be moved by an electromechanical actuator 50. The differential cylinder as the consumer 16 is connected to the utility ports A and B. The utility ports A, B are coupled with pressure sensors 52, 54, which transmit the pressure present there to a control unit ECU, which controls the motions of the control spool STS. The first utility port A of the valve 10 is connected to a bottom side 56 of the differential cylinder 16. The second utility port B is coupled to the rod end 58 of the differential cylinder 16. The differential cylinder 16 is finally provided to move a mass m, the self-weight of which is applied to a piston rod 60.

Figure 2:
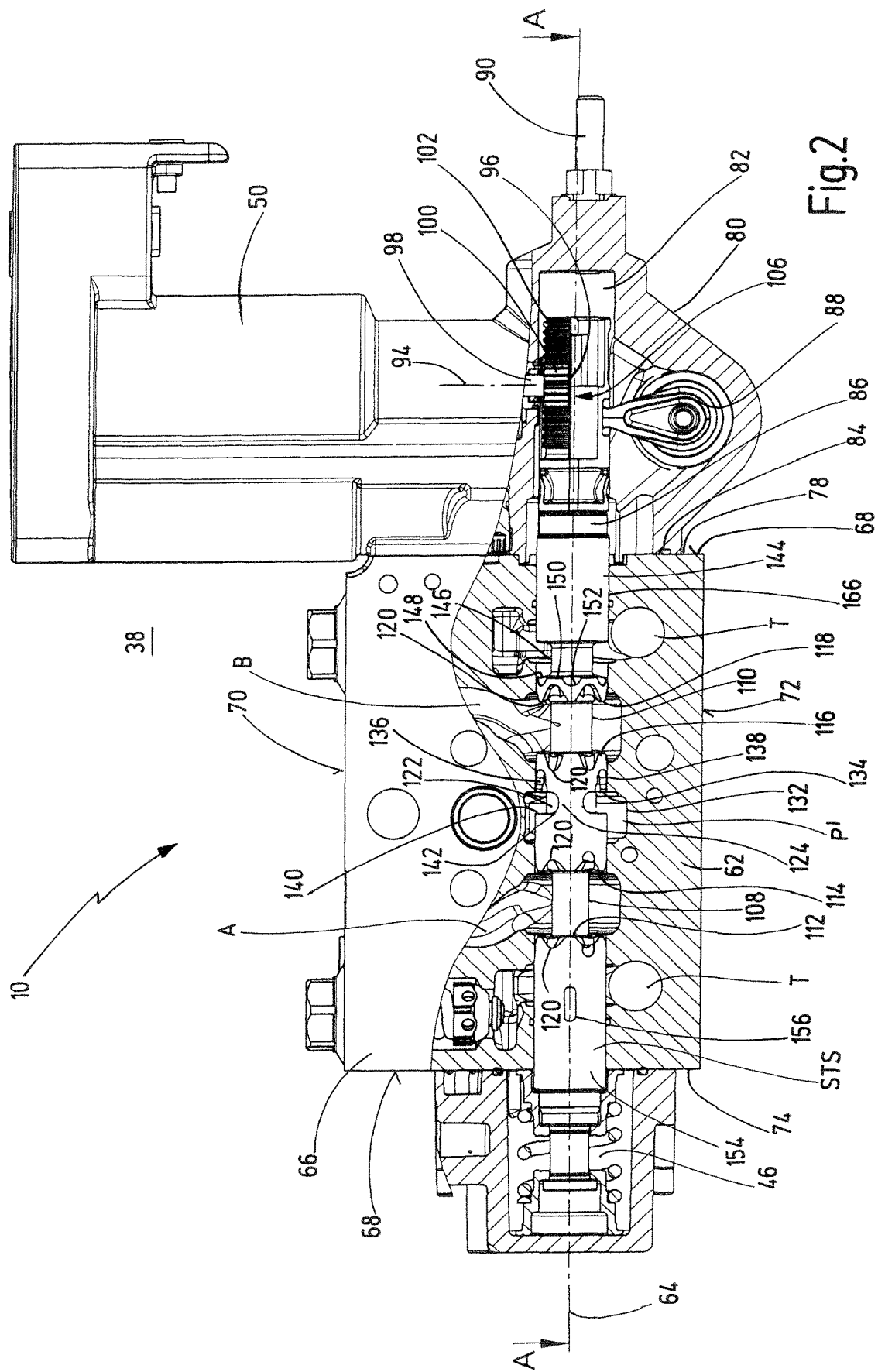
FIG. 2 is a side view in partial section of the valve according to the exemplary embodiment of the invention in a neutral position.
Figure 7:
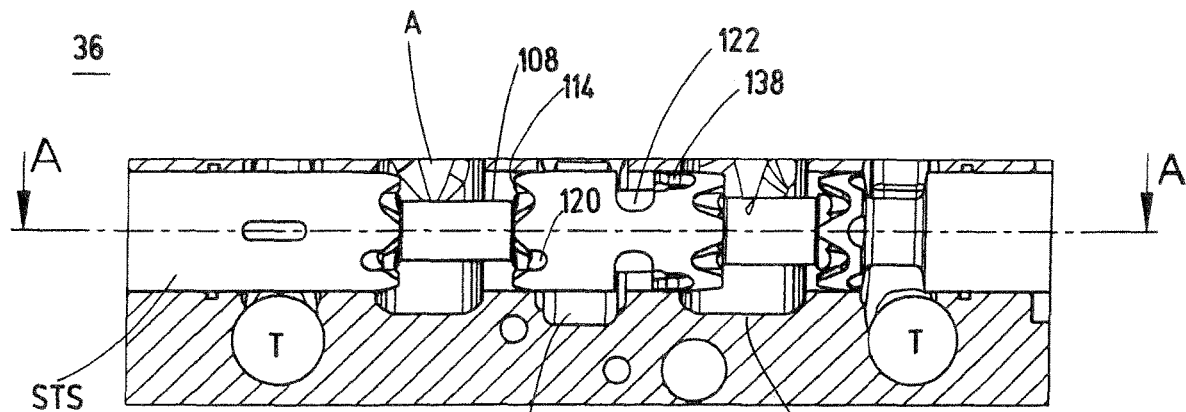
FIGS. 7-11 are side and plan views in section of the valve in a regeneration position.

FIG. 2 shows a partial section of the valve 10 according to the invention. The basic structure of this valve 10 corresponds to a known valve device, as it was disclosed, for instance, in application DE 10 2015 015 685 A1 of the proprietor. In accordance with the solution disclosed in this document, the control spool STS is arranged, movably along an axis 64, in a valve housing 62. The valve housing 62 has in pairs longitudinal sides 66 and end faces 68 opposing each other. Furthermore, the valve housing 62 has a top side 70 and a bottom side 72. On the valve housing 62 are also located, as usual for this type of valve device, housing ports, such as a pressure supply port P', two utility ports A and B and a return port T.

A spring assembly 46, located in the housing end region 74, predetermines, in the usual way for such valves 10, a neutral position or center position 38 for the control spool STS, such as the position taken by the control spool STS in FIG. 2. At the end 78, opposite from the housing end region 74 and located on the right in FIG. 2, a housing end part 80 adjoints to the valve housing 62. The housing end part 80 has an inner chamber 82, extending coaxially to the axis 64. Inner chamber 82 is sealed against the valve housing 62 by a seal 84, however is regarded as a component of the valve housing 62. Corresponding to the valve disclosed in DE 10 2015 015 685 A1, an end section 86 of the control spool STS extends into the chamber 82. In a manner also corresponding to the above-mentioned known solution, the control spool end section 86 interacts inside the chamber 82 with an actuating part 88 of an emergency actuation and a stroke length delimiter 90 of the control spool STS. Because this actuator structure also corresponds to the solution, known from the document mentioned above, based on adjustment bolts, no further description of that actuator structure is required. The electric motor, serving as an actuator 50, is arranged at the housing end part 8 in such a way that its drive axis 94 vertically intersects the displacement axis 64 of the spool piston STS. A pinion 100, located at one end 96 of a motor shaft 98, is located inside the chamber 82. As shown most clearly in FIG. 3, a toothed rack 102 is attached to the end section of the spool piston STS. That toothed rack 102 meshes with the pinion 100. As with the mentioned known solution, the control piston STS is guided non-rotatably in the chamber 82, such that the toothed rack 102 remains in contact with a guiding sliding element 104, which is attached to the wall of the chamber 82, during axial motions caused by the pinion 100. Instead of the sliding element 104 shown, a roller bearing or a roller could also be provided. The chamber 82, which is sealed to the outside, is filled with oil from the valve housing 62, such that the gear arrangement 106, formed by the pinion 100, the toothed rack 102 and the sliding element 104, runs in oil. The seal against the motor housing of the electric motor is formed by the O-ring seal 84, which is installed axially to the axis 64.

In the embodiment shown, an electric motor in the form of a permanently excited internal-rotor synchronous motor is provided as the actuator 50.

In the valve housing 62 the control spool STS is arranged, which is shaped according to the invention. The control spool STS has two utility port recesses 108, 110, which are assigned to the utility ports A and B. These utility port recesses 108, 110 each have proportional opening edges 112, 114, 116, 118 on both sides. Each proportional opening edge is provided with wedge-shaped or parabolic control grooves 120. Several such control grooves 120 are each distributed along the circumference. A regeneration recess 122 is provided between the utility port recesses 108, 110. The regeneration recess 122 is interrupted by a web 124, which is arranged in the estuary area 126 of a connecting line 128 of a load-sensing line 130. The regeneration recess 122 permits the second utility port B to be connected to an annular space 132 of the pressure supply port P', if the control spool STS is deflected from its central neutral position 38 to the right. The regeneration recess 122 has, on its side 134 facing the second utility port B, a proportional opening edge 136 having control grooves 138, while the opposite control edge 140 is formed by a simple step 142. There is a floating recess 146 arranged between the second utility port recess 110 and a free end 144 of the control spool STS, to which the rack 102 is attached. The floating recess also has a proportional opening edge 150 having this time circular segmental, in particular semicircular, control grooves 152 on its side 148 facing the second utility port B. The floating recess 146 can be used to establish a connection between the second utility port B and the return port T. Furthermore, the control spool STS at its left end 154 has a groove 156 running in an axial direction. The groove 156 permits the connection of a section of the load-sensing line 130 to the return port in the neutral position 38 of the control spool STS and preferably also in the floating position 40.

FIG. 3 shows a further section representation in a horizontal plane through the valve 10. A bore 158, in particular stepped, of the load-sensing line 130, which extends from a right side 160 into the valve housing 62, is clearly visible. Furthermore, three, preferably stepped, connection bores 128, 162, 164, connecting to the bore 166 of the control spool STS, are provided. The left connection bore 162 is arranged in such a way that the connection to the return port T can be made via the groove 156 in the neutral position 38 shown. The remaining two connection bores 164, 128 are covered by the control spool STS in the illustration shown, so that they cannot transmit the pressure in the utility ports A, B. FIGS. 4 to 6 show in detail representations again that in the neutral position 38 of the control spool STS, the left connection bore 162 overlaps with the groove 156, while the other connection bores 164, 128 assigned to the utility ports A, B are blocked by the control spool STS.

Figure 8:
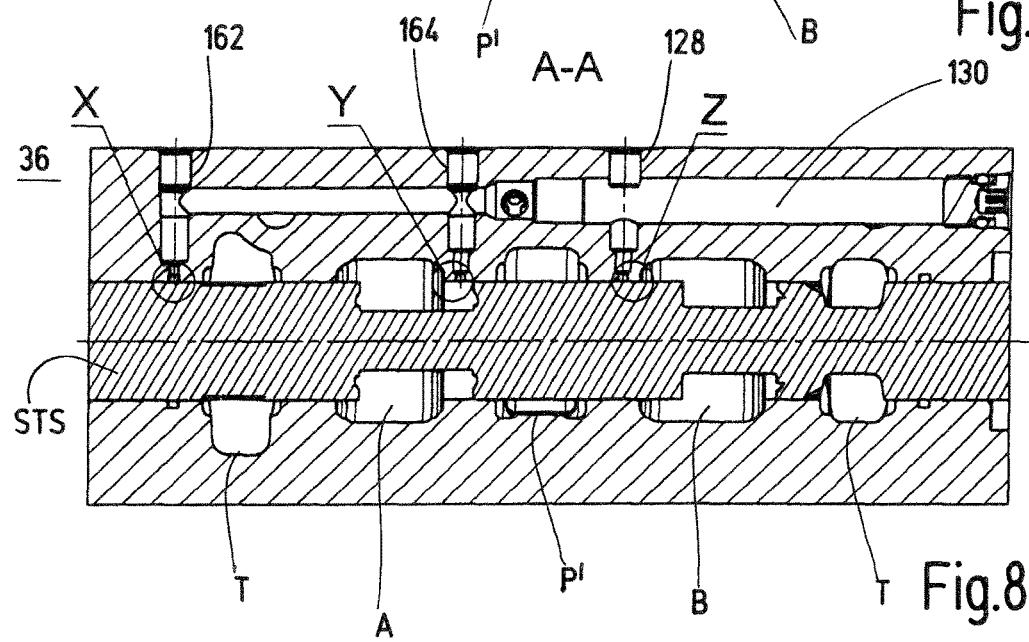
Figures 9, 10, 11:
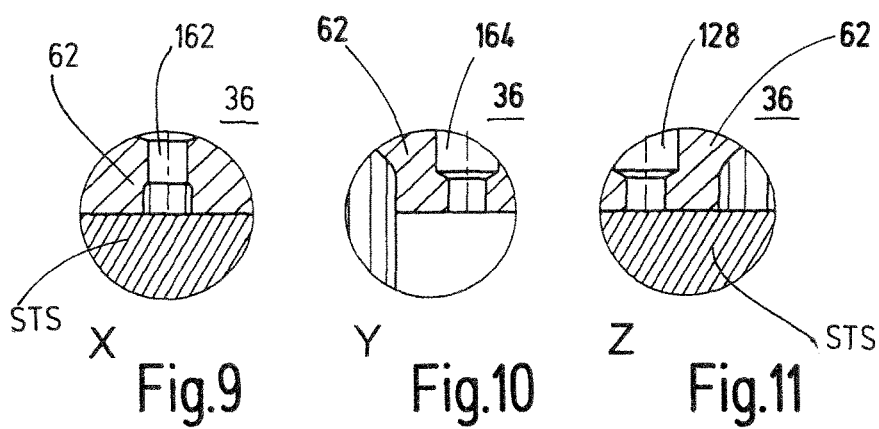
Figure 12:
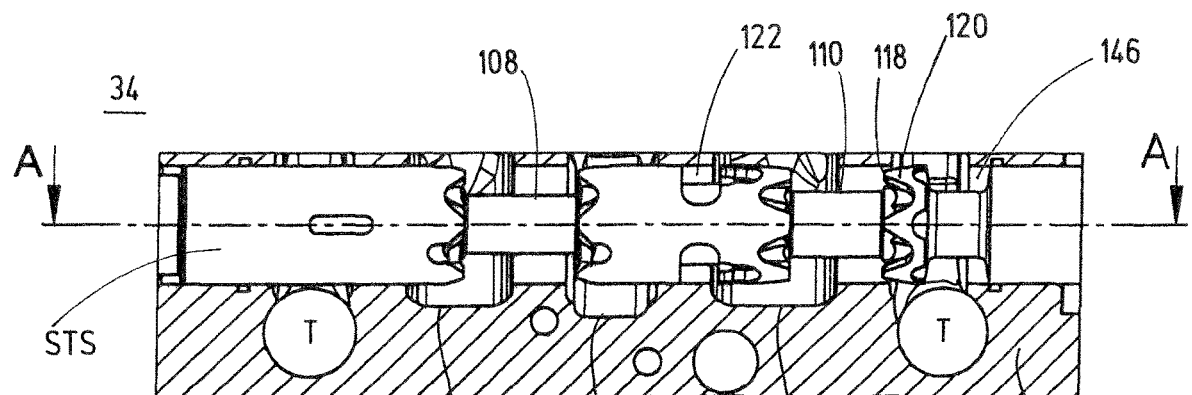
FIGS. 12-16 are side and plan views in section of the valve in a lifting position.
Figure 13:
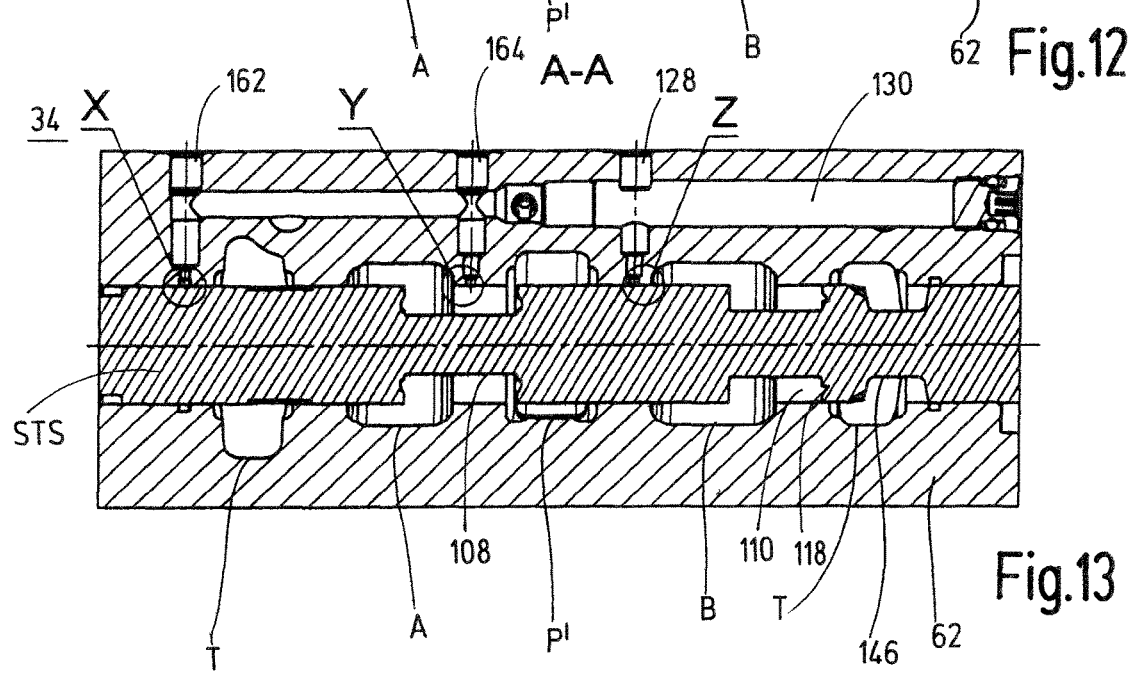
Figures 14, 15, 16:
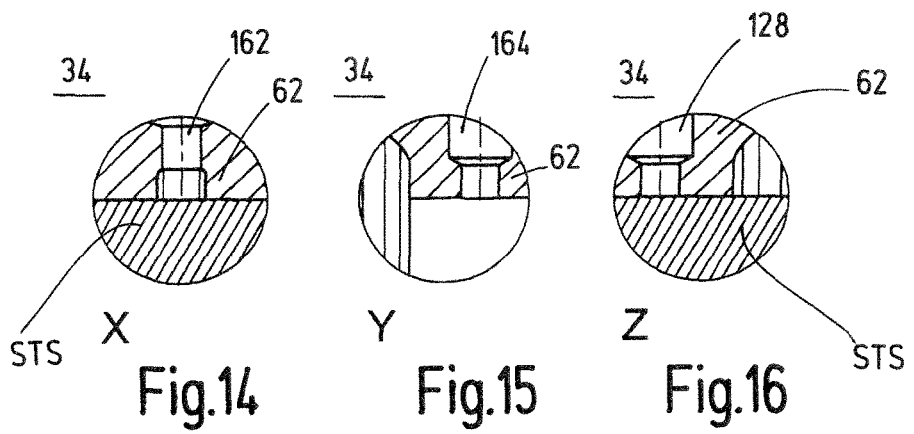
Figure 17:
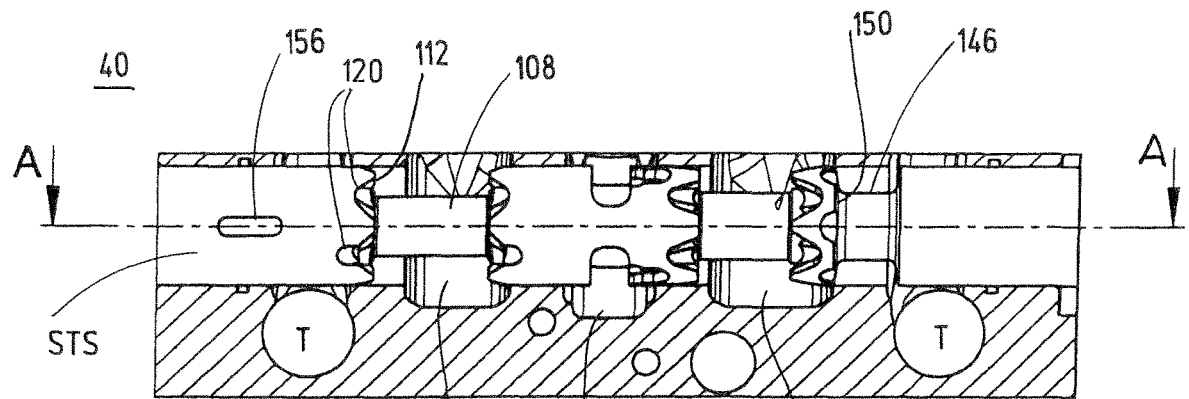
FIGS. 17-21 are plan and side views in the valve in a floating position.
Figure 18:
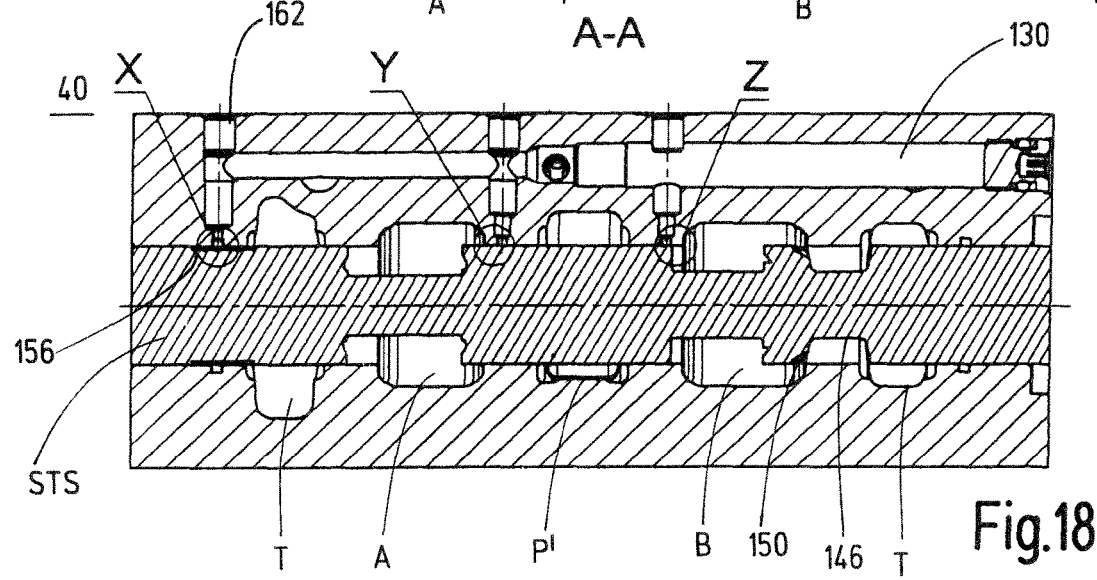
Figures 19, 20, 21:
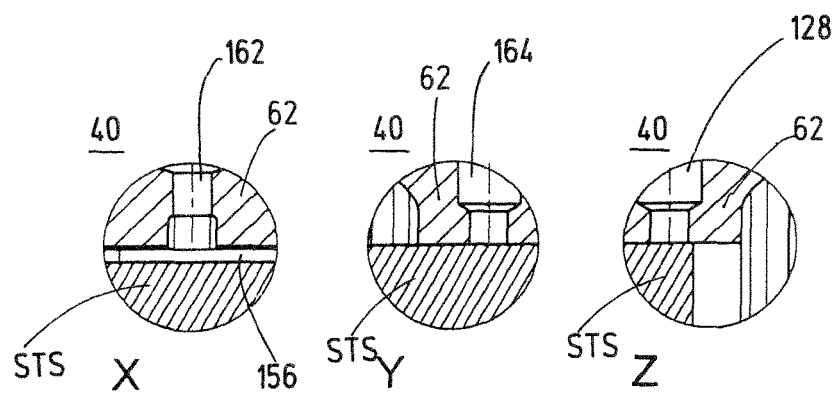
Figure 22:
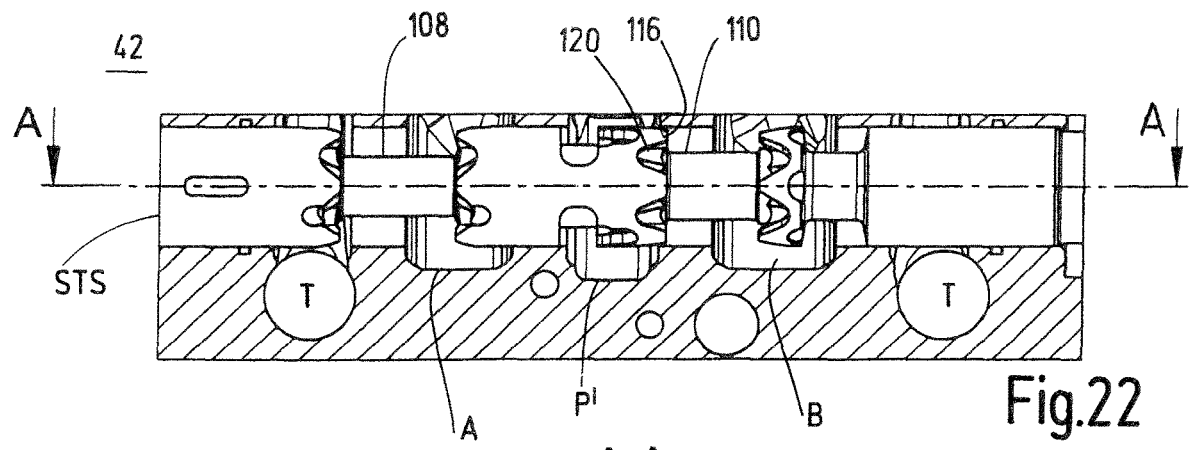
FIGS. 22-26 are side and plan views in section of the valve in a lowering position.
Figure 23:
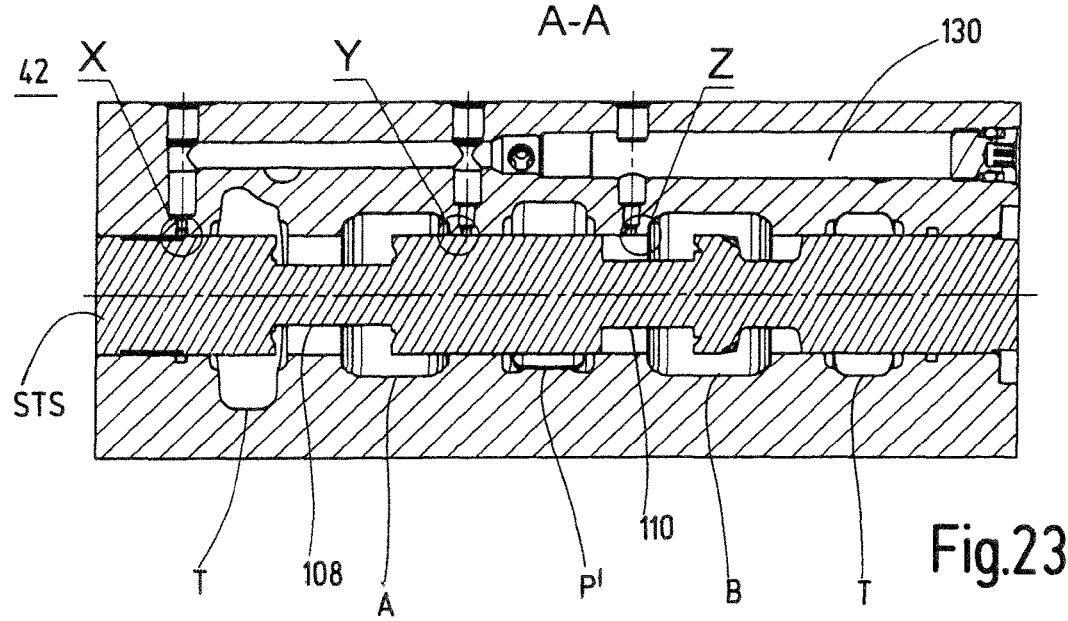
Figures 24, 25, 26:
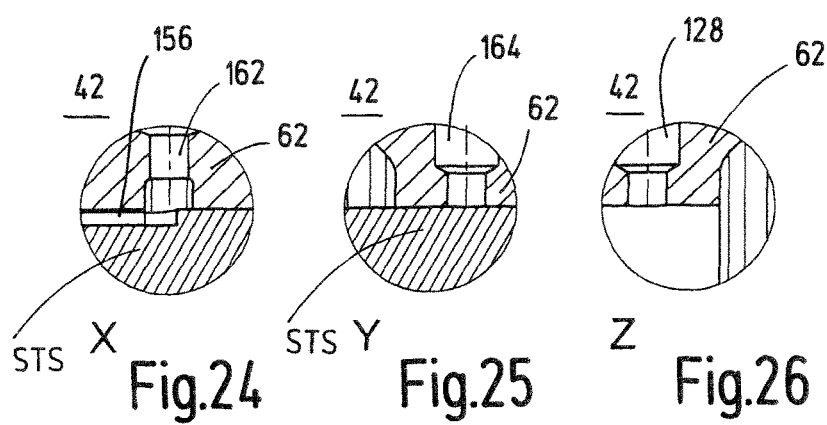

In FIGS. 7 to 11, the valve 10 is shown in the regeneration position 36. In this position 36, a fluid connection is established from the pressure supply port P' via the first utility port recess 108 to the first utility port A by the control edges 120 provided at the opening edge 114. Furthermore, the second utility port B is connected to the pressure supply port P' via the control groove 138 of the regeneration recess 122 and via this recess to the first utility port A. There is no connection from the second utility port B to the return port T. As can be seen in FIG. 8, in this position of the control spool STS, a fluid connection is established from the first utility port A, which is part of the supply line, to the load-sensing line only via the central connection bore 164. The control spool closes the two remaining connection bores 128, 162. In this way, the load pressure at the first utility port A is transmitted to the load-sensing line 130.

In FIGS. 12 to 16, the lifting position 34 of the control spool STS is shown. The control spool STS is now located in its right end position. In this position the pressure supply port P' is still connected to the first utility port A via the first utility port recess 108. There is also a fluid connection from the second utility port B to the return port T via the control grooves 120 on the opening edge 118 of the second utility port recess 110. The regeneration recess 122 is shifted to the right in the valve housing 62 to such an extent that there is no longer any connection between the second utility port B and the pressure supply port P'. Consequently, the utility ports A, B are separated from each other. In this position the floating recess 146 is without function. As can be seen in FIGS. 13 to 16, the central connection hole 164 continues to transmit the load pressure at the supply line or first utility port A into the load-sensing line 130.

The control spool STS still closes the connection bores 128, 162 on the right side and the left side.

In FIGS. 17 to 21, the control spool STS is shown in the floating position 40. In this position 40, the control spool STS is shifted to the left, so that the connection from the first utility port A to the return port T is established via the control grooves 120 on the left opening edge 112 of the first utility port recess 108. There is no connection from the pressure supply port P' to one of the utility ports A, B. Furthermore, the second utility port B is connected to the return port T via the opening edge 150 of the floating recess 146. The load-sensing line 130 is de-pressurized via the left connection bore 162 and the groove 156 in the control spool STS towards the return port T. The control spool STS blocks the two right connection bores 128, 162.

In FIGS. 22 to 26 the lowering position 42 is shown finally. In the lowering position 42, the control spool STS is moved to the left end position. The pressure supply port P' is connected to the second utility port B via the control grooves 120 of the left opening edge 116 of the second utility port recess 110, while the first utility port A is connected to the return port T via the first utility port recess 108. The regeneration recess 122 and the floating recess 146 are ineffective. As can be seen in FIGS. 23 to 26, the right connection bore 128 now transmits the load pressure at the second utility port B, which in this position is part of the supply line, to the load-sensing line 130. The control spool STS closes the two remaining connection bores 162, 164.

The valve 10 according to the invention can be used to implement the more energy-efficient logics of neutral-regeneration-lifting or neutral-floating-lowering, in which it is ensured that the hydraulic fluid available in the differential cylinder 16 is first used to move the load m before the pump supplies additional hydraulic fluid. In this way, a very small pump volume flow is required for the load case "lifting at low load" and in the load case "lowering at high load." It may even possible that no pump volume flow is required at all. This is without parallel in the prior art.

While one embodiment has been chosen to illustrate the invention, it will be understood by those skilled in the art that various changes and modifications can be made therein without departing from the scope of the invention as defined in the claims.

The invention claimed is:

1. A valve, comprising:
    a valve housing having a pressure supply port, first and second utility ports and a return port; and
    a control spool being guided for longitudinal movement in the valve housing and controlling fluid communication connections between the pressure supply port, the first and second utility ports and the return port, all of the fluid communication connections being blocked when the control spool is in a central neutral position in the valve housing, the pressure supply port being connected in fluid communication with the first utility port and the second utility port being connected with the return port in fluid communication when the control spool moves from the central neutral position in a first direction toward a first end position in the valve housing, the pressure supply port being connected in fluid communication with the second utility port and the first utility port being connected in fluid communication with the return port when the control spool moves from the central neutral position in a second direction opposite the first direction toward a second end position in the valve housing, the first and second utility ports being separated from each other in fluid communication when the control spool is in the first and second end positions in the valve housing, the first and second utility ports being connected to each other in fluid communication when the control spool is in a regeneration position between the central neutral position and the first end position and in a floating position between the central neutral position and the second end position.

2. A valve according to claim 1 wherein
    the first utility port is connected in fluid communication with the second utility port in the regeneration position via the pressure supply port.

3. A valve according to claim 2 wherein
    the control spool comprises two circumferential recesses connecting the first and second utility ports in fluid communication via the pressure supply port.

4. A valve according to claim 1 wherein
    the first utility port is connected with the second utility port in fluid communication in the floating position via the return port.

5. A valve according to claim 1 wherein
    the control spool comprises two circumferential recesses connecting the first and second utility ports in the fluid communication via the return port.

6. A valve according to claim 1 wherein
    the control spool comprises first and second utility port recesses overlapping the first and second utility ports, respectively, and comprises a regeneration recess between the first and second utility port recesses and a floating recess between the second utility port recess and an adjacent free end of the control spool.

7. A valve according to claim 6 wherein
    each of the first and second utility port recesses, the regeneration recess and the floating recess have a proportional opening edge with a control groove.

8. A valve according to claim 1 wherein
    a load-sensing line is in the valve housing and is capable of being de-pressurized in the central neutral position of the control spool via a recess in the control spool opening towards the return port.

9. A valve according to claim 8 wherein
the load-sensing line is directly connected to one of the first and second utility ports in fluid communication when the control spool is in the central neutral position.

10. A valve according to claim 1 wherein
first and second pressure sensors are connected to the first and second utility ports, respectively, and are connected to a control controlling movement of the control spool.

11. A valve according to claim 1 wherein
an electromechanical actuator is coupled to and moves the control spool in the valve housing.

12. A valve, comprising:
a valve housing having a pressure supply port, first and second utility ports and a return port; and
a control spool being guided for longitudinal movement in the valve housing and controlling fluid communication connections between the pressure supply port, the first and second utility ports and the return port, all of the fluid communication connections being blocked when the control spool is in a central neutral position in the valve housing, the pressure supply port being connected in fluid communication with the first utility port and the second utility port being connected with the return port in fluid communication when the control spool moves from the central neutral position in a first direction toward a first end position in the valve housing, the pressure supply port being connected in fluid communication with the second utility port and the first utility port being connected in fluid communication with the return port when the control spool moves from the central neutral position in a second direction opposite the first direction toward a second end position in the valve housing, the first and second utility ports being separated from each other in fluid communication when the control spool is in the first and second end positions in the valve housing, the first and second utility ports being connected to each other in fluid communication when the control spool is in a regeneration position via the pressure supply port and in a floating positon with each of the regeneration position and the floating position being between the central neutral position and one the first and second end positions, the first utility port being connected in fluid communication to the second utility port via the pressure supply port in the regeneration position.

13. A valve according to claim 12 wherein
the control spool comprises two circumferential recesses connecting the first and second utility ports in fluid communication via the pressure supply port.

14. A valve according to claim 12 wherein
the first utility port is connected with the second utility port in fluid communication in the floating position via the return port.

15. A valve according to claim 14 wherein
the control spool comprises two circumferential recesses connecting the first and second utility ports in the fluid communication via the return port.

16. A valve, comprising:
a valve housing having a pressure supply port, first and second utility ports and a return port; and
a control spool being guided for longitudinal movement in the valve housing and controlling fluid communication connections between the pressure supply port, the first and second utility ports and the return port, all of the fluid communication connections being blocked when the control spool is in a central neutral position in the valve housing, the pressure supply port being connected in fluid communication with the first utility port and the second utility port being connected with the return port in fluid communication when the control spool moves from the central neutral position in a first direction toward a first end position in the valve housing, the pressure supply port being connected in fluid communication with the second utility port and the first utility port being connected in fluid communication with the return port when the control spool moves from the central neutral position in a second direction opposite the first direction toward a second end position in the valve housing, the first and second utility ports being separated from each other in fluid communication when the control spool is in the first and second end positions in the valve housing, the first and second utility ports are connected to each other in fluid communication when the control spool is in a regeneration position and in a floating position with each of the regeneration position and the floating position being between the central neutral position and one of the first and second end positions, the control spool having first and second utility port recesses overlapping the first and second utility ports, respectively, and having a regeneration recess between the first and second utility port recesses and a floating recess between the second utility port recess and an adjacent free end of the control spool.

17. A valve according to claim 16 wherein
each of the first and second utility port recesses, the regeneration recess and the floating recess have a proportional opening edge with a control groove.

* * * * *